Patented May 7, 1929.

1,711,499

UNITED STATES PATENT OFFICE.

MAX HOSSÄSS, OF MANNHEIM-NEUOSTHEIM, GERMANY.

METHOD OF HYDROGENATING AND TREATING CARBONACEOUS MATERIALS.

No Drawing. Application filed November 30, 1926, Serial No. 151,842, and in Germany December 2, 1925.

The hydrides of anthracene and other organic compounds of the aromatic series, which contain their hydride hydrogen in an unstable state of combination at high temperatures, are excellently well suited for carrying out the hydrogenation and reduction of organic and inorganic compounds, which otherwise are difficult to hydrogenate and reduce. If such substances be heated in the presence of the said hydrides under pressure of hydrogen to high temperatures, the hydrides transfer the gaseous hydrogen to the compounds to be reduced and bring about their hydrogenation and reduction. Even on the addition of a few per cent of these hydrides can a far reaching result be obtained.

It is by no means necessary to use pure hydrides. It suffices to add such hydrogenating products which are obtained for example when impure crude anthracene or so called anthracene residues are heated under pressure of hydrogen. In some cases it is even possible to add these crude raw materials themselves in the main process. In this reaction the anthracene, which is readily hydrogenated and its accompanying substances first take up the hydrogen and then act after the high temperature of the reaction has been reached, as carriers of hydrogen in the sense above indicated.

One of the most important uses of the new process is the obtaining of benzine from hydrocarbon products, such as crude petroleum, petroleum residues, oil shale, oil sand lignite and pit coal. On hydrogenating and decomposing these crude substances by heating them under high pressure of hydrogen by the process which is known as the Bergin process or berginization certain temperature limits e. g. 440 or 470 degrees C. must not be exceeded on the whole when the process is worked continuously as otherwise the formation of coke takes place. The yield of the valuable benzine is however the greater the higher the temperature of the reaction is raised, and the temperature may be made the higher the more hydrogen there is added on per unit of time.

This action of the presence of readily decomposable hydrides produces therefore when the Bergin process is used a considerable increase in the yield of benzine.

So far as the hydrides act as catalysts that is to say as mere carriers of gaseous hydrogen they are found in the product of the reaction again and can be recovered therefrom. For this purpose it is of advantage to heat the mixture obtained by the distillation of the product from the crude substance and the hydrides of anthracene and its homologues or a definite fraction of the mixture subsequently to a temperature which is higher than was maintained in the main reaction. If for example the heating can be carried beyond 500 degrees C. complete dehydrogenation and simultaneously further decomposition and hydrogenation of the first products of the crude material can be obtained. The anthracene and its accompanying substances are present in a narrowly limited fraction so that they can be separated in a simple manner namely by distillation.

A not inconsiderable portion of the hydrides is also decomposed during the main process and converted into lower boiling simple compounds of the aromatic series such as benzine, tolulene or other hydroaromatic substances such as tetrahydronaphthalene. This fact is of far reaching importance for the benzine produced, because the said substances have as is well known a particularly favourable action on the so-called knocking of the benzine when used as a motor fuel.

If for example crude anthracene be used alone under high pressure of hydrogen and heated to a high temperature a mobile product the portion of which boiling up to 210 degrees C. has a specific gravity of $d_{15}=0.902$ and shows a boiling curve of from 82 to 210 degrees C. with a comparative uniform rise. According to the conditions of the reaction observed the hydrogenation and decomposition of such substances can be pushed as far as may be desired. If this reaction takes place simultaneously with the berginization of a petroleum of paraffinic or asphaltic basis the decomposition of the aromatic additional substances is still further assisted. The petroleum benzines obtained by this reaction can be made proof against "knocking" by the aromatic decomposition products so obtained in the cheapest and simplest manner and they therefore afford an admirable motor fuel.

It is obvious of course that the aromatic substances obtained in the berginization of crude anthracene may also have pure petroleum benzine or benzine obtained by cracking added to them.

As in the berginization of petroleum or petroleum residues the addition of hydrides of anthracene and its homologues acts in an excellent manner so does it also in the berginization of coal or coal products. A few examples of the way in which this invention may be carried out will now be given and which will also enable a comparison to be made with the results of the previously known processes.

(1) Mexican Panuco-crude which in the ordinary berginization with 5% of alkaline iron oxide (e. g. lux compound) cannot be heated without risk of coking above 440 degrees C. and then only yields about 20 parts by weight per cent of motor fuel boiling up to 220 degrees C. (navy benzine) can by the addition of 5% of hydrogenated crude anthracene be berginized up to 500 degrees C. without any formation of coke. The yield of motor fuel now amounts to 50% of the raw material. The same raw material yields when cracked by the Dubbs method only from 20 to 25 per cent of benzine by intermittent working and coke is formed.

(2) A gas flame coal was berginized once mixed with prepared pit coal tar (ratio 2:1) and with the addition of 5% of alkaline iron oxide at 470 degrees C. The second time the tar was furthermore mixed with a hydride obtained from crude anthracene (60 parts of tar to 10 parts of hydride). Under otherwise perfectly similar conditions 41% of oil was obtained in the first case and in the second case 56%. Of the unopened up coal there remained on the first occasion 18% and on the second occasion only 8.1 per cent of the coal used.

(3) From a Canadian oil sand there was separated by treatment with hot water the oil which was a tough smeary mass and this oil mixed with 5% of alkaline iron oxide and 5% of hydrogenized crude anthracene was berginized at 480 degrees C. The product was a mobile oil (yield 85% of the raw material) containing 30% of navy benzine.

According to the conditions of reaction selected the yields given in the examples can be still further increased. Such reaction conditions are the height of the working pressure the reaction temperature and the selection of inorganic added substances. Such added substances may be in addition to metallic oxides (iron oxide) metals e. g. sodium, metallic salts, e. g. magnesium bromide, coal ash, coke dust and many others.

In the examples given above the excellent hydrogenating and reducing effects of hydrides of anthracene and its homologues on organic raw materials has been shown. The hydrides act in the same way under suitable conditions also in the preparation of inorganic materials e. g. in the reduction of metallic oxides, sulphates or in the synthesis of ammonia from its elements or from compounds of nitrogen of an inorganic or organic nature.

What I claim and desire to secure by Letters Patents of the United States is:—

1. The method of hydrogenating and treating carbonaceous material comprising heating said matter under pressure of hydrogen and in the presence of hydride of anthracene and its homologues to a temperature at which the hydrogen in said hydride becomes unstable.

2. The method of hydrogenating and treating carbonaceous material comprising heating said matter under pressure of hydrogen and in the presence of a hydride of crude anthracene to a temperature at which the hydrogen in said hydride becomes unstable.

3. The method of hydrogenating and treating carbonaceous material comprising heating said matter under pressure of hydrogen and in the presence of anthracene residue containing hydride to a temperature at which the hydrogen in the hydride becomes unstable.

4. The method of hydrogenating and treating carbonaceous material comprising heating said matter under pressure of hydrogen and in the presence of a mixture of a hydride of anthracene and its homologues and an inorganic substance to a temperature at which the hydrogen in said hydride becomes unstable.

5. The method of manufacturing benzine from a hydrocarbon compound comprising heating said compound under pressure of hydrogen in the presence of a hydride of anthracene and its homologues to a temperature at which the hydrogen in said hydride becomes unstable.

6. The method of hydrogenating and treating carbonaceous material comprising heating said matter under pressure of hydrogen in the presence of a hydride of anthracene and its homologues to a temperature at which the hydrogen in said hydride is rendered unstable, and then subsequently heating the product of the reaction to a higher temperature to separate therefrom the raw material of the organic hydride.

7. The method of hydrogenating and treating carbonaceous material, comprising heating said matter under pressure of hydrogen in the presence of a hydride of anthracene and its homologues to a temperature at which the hydrogen in said hydride is rendered unstable, fractionating the product so produced, and then heating a fraction of the product to a higher temperature to separate hydride therefrom.

Dr. MAX HORSÄSS.